United States Patent [19]
Josephs

[11] 4,012,219
[45] Mar. 15, 1977

[54] METHOD FOR RECLAIMING VARIEGATED WASTES

[76] Inventor: Walter Josephs, 1924 Courtland Ave., Oakland, Calif. 94601

[22] Filed: May 6, 1976

[21] Appl. No.: 683,786

Related U.S. Application Data

[63] Continuation-in-part of Ser. No. 569,553, April 18, 1975, abandoned.

[52] U.S. Cl. .................................. 71/9; 71/12; 71/31; 71/64 SC; 71/64 JC; 210/15; 210/170; 61/35
[51] Int. Cl.² .................................. C05F 11/08
[58] Field of Search .............. 61/35; 71/1, 8, 9, 10, 71/12, 13, 31, 64 SC, 64 JC, 64 C; 210/1, 10, 18, 15, 24, 42, 83, 170

[56] References Cited
UNITED STATES PATENTS

| | | | |
|---|---|---|---|
| 103,085 | 5/1870 | Ruggles | 71/10 |
| 254,322 | 2/1882 | Howell | 61/35 |
| 2,756,134 | 7/1956 | Novak | 71/9 |
| 2,860,448 | 11/1958 | Carasso | 71/64 SC |
| 2,969,279 | 1/1961 | Pierson | 71/9 |
| 3,250,606 | 5/1966 | Murray | 71/1 |
| 3,431,675 | 3/1969 | Moore | 71/9 |
| 3,579,320 | 5/1971 | Pesses | 71/10 |
| 3,630,400 | 12/1971 | De Koning | 210/83 |
| 3,659,712 | 5/1972 | Chaplin | 210/83 |
| 3,732,089 | 5/1973 | Megronigle | 71/8 |
| 3,780,471 | 12/1973 | Ort | 210/170 |
| 3,859,799 | 1/1975 | Jaco | 210/42 R |
| 3,954,615 | 5/1976 | Shelef | 210/170 |
| 3,956,119 | 5/1976 | Davidtz | 71/64 SC |

FOREIGN PATENTS OR APPLICATIONS

| | | | |
|---|---|---|---|
| 1,275,026 | 8/1968 | Germany | 61/35 |
| 2,243,805 | 3/1973 | Germany | 71/12 |

OTHER PUBLICATIONS

Engineering News–Record, vol. p. 764, pp. 68–70, "Improved Landfill Practice Saves Money".

Primary Examiner—Charles N. Hart
Assistant Examiner—Ernest G. Therkorn
Attorney, Agent, or Firm—Harris Zimmerman

[57] ABSTRACT

A method for reclaiming variegated wastes such as garbage, sewage, and saline dredging spoils includes the primary step of desalinization of the dredging spoils by draining off the salty water. The garbage is cleaned of non-organic material, and the remaining material is shredded and reduced to a slurry. The slurry is mixed with raw or primarily treated sewage and the treated spoils, and pumped through a pipe-line to a treatment and reclamation area. In transit, the clay particles within the dredging spoils adsorb suspended solids and dissolved organic and inorganic contaminants, aided by the agitation of the transit. At the treatment area, the solids are removed by settling, and composted to form rich agricultural soil. The water is treated with biological and/or chemical means until suitable for desired use or may be used directly for irrigation purposes or the like.

4 Claims, 1 Drawing Figure

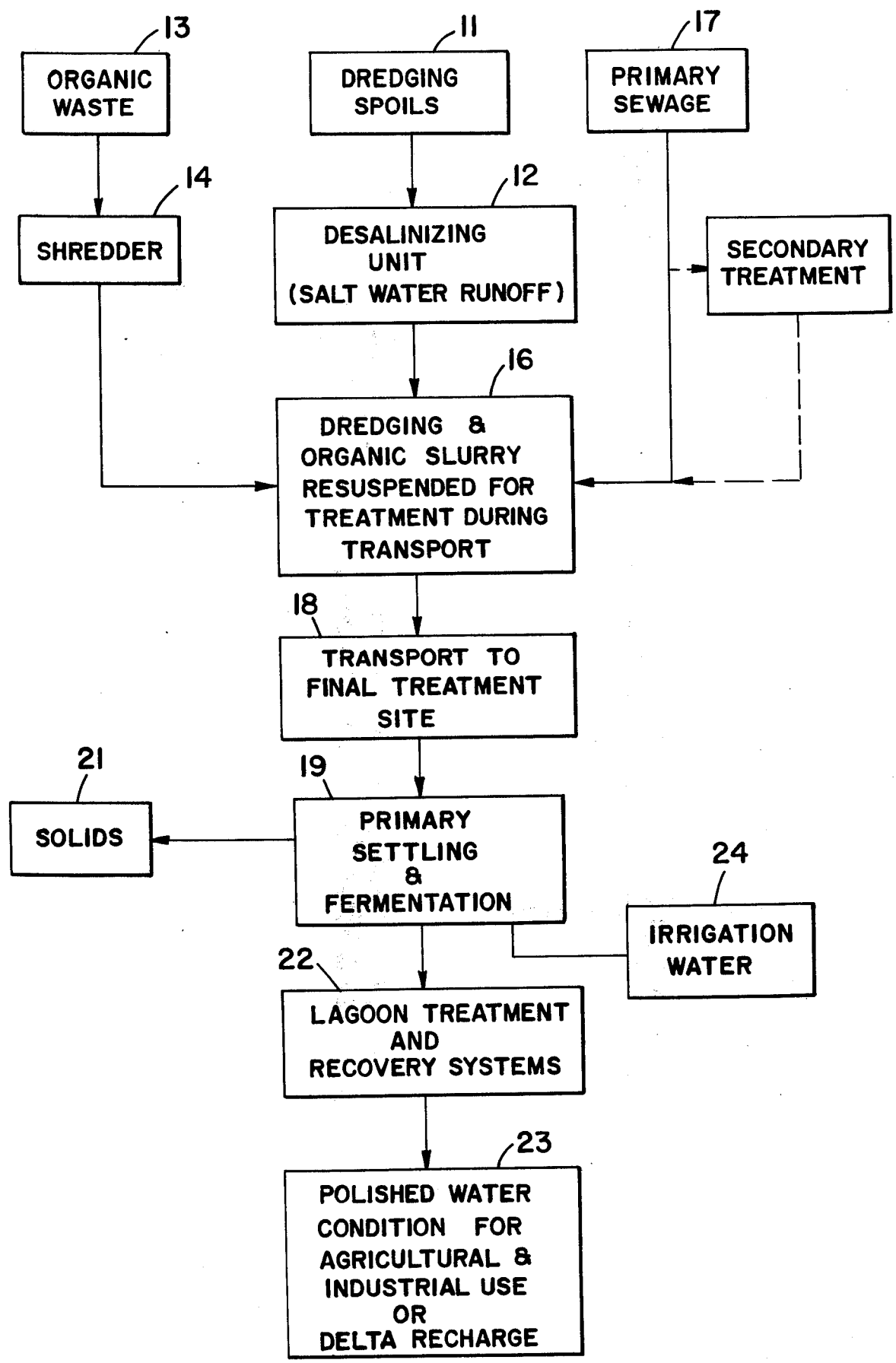

METHOD FOR RECLAIMING VARIEGATED WASTES

REFERENCE TO RELATED APPLICATION

This application is a continuation-in-part of application Ser. No. 569,553, filed on Apr. 18, 1975, now abandoned.

BACKGROUND OF THE INVENTION

It is a well recognized fact that many urban centers have grave difficulties in disposing of human and industrial wastes such as sewage and garbage. These waste products are generally contaminated with bacteria, chemicals, and toxic materials, and are therefore deemed suitable only for disposal. Yet both sewage and garbage contain a wealth of reclaimable materials, as well as a high concentration of biological nutrients. Generally speaking, these potentially useful materials are not reclaimed, due to the difficulty and cost of separating them from the contaminants.

Thus, these waste products are disposed of by land-fill techniques or incineration, in the case of garbage, and by dumping the sewage into estuaries and large bodies of water. Sewage is often given primary and secondary treatment to remove the most dangerous contaminants, in an attempt to reduce the pollution of existing water resources to acceptable levels. Experience has shown, however, that current treatment methods cannot generally economically cope with the increasing volume of sewage, nor with the newer contaminants, e.g., heavy metals, pesticides, phosphates, and the like, contained therein. Likewise, garbage land-fill locations near urban centers are becoming scarce. An ecological crisis seems imminent.

Another waste product disposal problem of little general knowledge, but of great importance, involves the dredging of deep-water harbors and estuaries to maintain ship channels. Millions of cubic yards of material are dredged annually and must be disposed of in a manner compatible with the surrounding environment. Often these dredging spoils are highly saline, and cannot be dumped on land without the risk of contaminating the ground water. Dumping the spoils in the shallows and shoals of bays and estuaries can create such turbidity as to threaten the local fish, waterfowl, and wildlife. It has been proposed to transport these spoils to deep ocean locations for dumping, a method which is economically unfeasible for so large a volume of material, and which also results in the loss of this material which could otherwise be put to practical agricultural usage.

SUMMARY OF THE INVENTION

All of the waste product disposal problems mentioned in the foregoing appear, when taken individually, as incapable of solution without enormous expenditures and technological developments. Yet when viewed as an overall system, these problems are susceptible to a joint solution, as disclosed herein, which is economically feasible and ecologically desirable.

It is known that dredging spoils often contain a significant amount of clay particles, and that clay particles easily acquire several molecular monolayers of water, when available. Due to the fact that saline dredging spoils are caused by natural erosion in fresh water watersheds, the clay particles initially acquire monolayers of fresh water. These layers remain even after the clay is carried downstream into a saline environment. Thus the salinity of dredging spoils is due to the admixture of the spoils with salt water, not to adsorption of salt water.

One aspect of the present invention comprises the desalinization of clay-bearing dredging spoils by first dumping the spoils into corrals located on the shore of a saline body of water. The spoils are permitted to settle, and the salt water is drained or pumped away. The resulting mud is a low salinity, clay-bearing material. This material is then used to treat the sewage and garbage.

The garbage is cleaned to remove useful materials, and the remaining, highly-organic material is shredded and mixed with water to form a slurry. It is then mixed with raw sewage from municipal sewage collection pipes, and with the desalinated dredging spoils. This mixture is then pumped through a pipe-line or other suitable means to a treatment and reclamation area. In transit, the movement of the mixture provides an agitating action, which exposes the clay particles of the spoils to the suspended solids and dissolved contaminants in the mixture. The clay particles act as a nucleating agent for the solids and contaminants, adsorbing as much as two and one-half times their weight of these substances.

At the treatment site the mixture is further agitated if required, and placed in settling tanks. The organically rich solids are removed and composted to form a rich soil suitable for agriculture. The water is used for irrigation or is purified and used for industry or agriculture, or released.

It should be noted that the clay particles have the ability to adsorb contaminants such as harmful metals, toxic materials, and the like, and to retain these substances. After the clay is incorporated into a soil, the adsorption bond is sufficiently strong to prevent the uptake of these substances by plants grown in the soil. Thus the output of the waste product reclamation method of the present invention is a useful soil which may be used to bolster and replenish agricultural soil, and water which is of sufficient purity to be re-used for agricultural and industrial purposes.

THE DRAWING

The FIGURE is a flow chart of the method of the present invention.

DESCRIPTION OF THE PREFERRED EMBODIMENT

The preferred embodiment of the present invention is directed in particular toward solving the waste product disposal problems of the San Francisco Bay region of the United States, and at the same time alleviating the seasonal flooding conditions in the Sacramento River delta of California. However, the methods of the present invention may be employed to reclaim the waste products of many urban areas.

The delta region is disposed at virtually the same elevation as the bays into which it flows, so that the delta is a brackish, tidewater area. In the arid, hot summer months, the river flow diminishes to the extent that fresh water input to the delta barely equals the evaporation rate therefrom. Recent water diversion products have exacerbated this situation, increasing the salinity of the delta water and seriously affecting the local ecology. The numerous low islands of the delta are composed of peaty soils, and due to intensive agricultural coupled with the weather patterns of the area, the surface level of the land has descended below the mean water level of the delta. Approximately 500 miles of dikes have been constructed to protect this land, yet many of the islands are still innundated during the flood season.

In the San Francisco Bay region, garbage disposal as well as sewage treatment and disposal poses a serious problem for the municipalities which line both sides of the bay. Pollution of the bay an coastal waters has resulted in stringent controls on contaminants such as sewage which may be dumped into these waters, and caused the planning of extensive additional sewage treatment facilities. Sites for disposal of garbage through sanitary land-fill techniques are becoming scarce in this region, and expensive transportation of the garbage to outlying sites is being contemplated.

The situation in this region may be summarized as a dilemma in which waste product disposal techniques are outmoded and intolerable in view of the volume of waste and the current water quality standards, and in which the delta region faces gradual destruction due to lack of fresh water and land erosion. The present invention comprises a method of solving all of these problems.

According to the present invention, solid and organic waste 13, such as municipal garbage, is sifted to remove reclaimable and undesirable materials, and then is passed through a shredder 14. Dredging spoils 11 are transported to a desalinization unit 12, which comprises diked areas located either on the bay shoreline or just offshore. As explained in the foregoing, the salinity of the spoils is due primarily to the admixture of salt water with the mud, rather than to the adsorption of the salt to the clay particles in the mud, since the clay slit originated in the fresh water of the rivers. Thus, in the diked areas the salt water is segregated by settling from the sediments, and the water is drained or pumped away. In this manner the salinity of the mud is reduced from 30 parts per thousand to less than three parts per thousand.

The shredded organic waste and the desalinated mud are then mixed together at 16, and suspended in a primary sewage 17 to form a slurry capable of being transported hydraulically. If necessary, the sewage may be given a secondary treatment prior to mixing at 16. The slurry is then pumped, as shown at 18, through a large diameter pipe line to the disposal site. An important aspect of the invention is that the pumping and transfer step serves not only to deliver the slurry to a distant location, but also agitates the mixture of spoils and organic waste. In this way the clay particles of the spoils are exposed to all of the remaining material in the slurry. The clay particles act as a nucleating agent, adsorbing dissolved contaminants and suspended solids. If the length of the journey is too short to provide sufficient agitation to achieve full adsorption, a pipe-line having flutes or vanes to increase agitation may be used. For long pipeline transport, it may be necessary to inject air into the pipeline to maintain the bacteria in the slurry in a viable condition. It is also important to note that the aforesaid action takes place at 16, where the mixing of the waste and mud first occurs.

The treated slurry arrives at the delta and is placed in a primary settling and fermentation pond or corral 19. Here the solids 21 separate from the water in the slurry by gradual settling. The water is drained or pumped away, and, as it is rich in nitrates, may be used immediately for irrigation, as shown at 24. The solids remain in the corral, where they compost into rich agricultural soil. The soil may then be distributed as required to adjacent areas.

It should be noted that the clay particles adsorb dissolved metal contaminants and suspended contaminants with a bond sufficiently strong that agricultural crops cannot take up the metals. Thus the irrigation water 24 is free of these contaminants. The black, rich soil formed in the composting process does contain the contaminants, but they do not pose a threat to the local environment, nor to the consumers of the crops.

Water from the primary settling process which is not used for irrigation is pumped to a lagoon treatment and recovery system 22, where algal blooms are used to rid the water of nitrates. The resulting polished water 23 may be used for other agricultural purposes, for industrial purposes such as cooling, or may be discharged into the delta to augment fresh water supplies to the delta.

Thus the present invention discloses a method for solving the most pressing waste disposal problem of a large urban area, and at the same time provides a source of rich agricultural soil to replenish soils which are depleted due to natural or man-made conditions.

It should be understood that where the term "clay-bearing dredging spoils" is used herein, it is intended to include clays which are found or appear naturally in the silt or along the bottom of estuaries or the like, as well as the addition of clays to the spoils where adequate amounts of clay are not naturally occurring.

I claim:

1. A method for reclaiming waste products and dredging spoils, comprising the steps of:
    desalinating clay-bearing dredging spoils by placing the spoils in corrals, segregating the sea water from the sediment, and draining away the sea water,
    mixing said desalinated dredging spoils with sewage to form a slurry,
    piping said slurry to a disposal site and mixing said slurry during piping to effect exposure and adsorption of contaminants of said primary sewage to the clay particles of said dredging spoils,
    separating said slurry into solids and waste water, said solids including said contaminants adsorbed to said clay particles, and composting said solids remaining after separation of said slurry.

2. The method of claim 1, further including the step of shredding solid organic waste and mixing said shredded waste with said primary sewage and said desalinated dredging spoils prior to said transporting step.

3. The method of claim 1, wherein said waste water separated from said slurry is treated in algal rearing ponds to remove nitrate substances therefrom.

4. The method of claim 1, further including the step of injecting air into the slurry during piping to provide sufficient oxygen to maintain the bacteria in said slurry in a viable condition.

* * * * *